UNITED STATES PATENT OFFICE.

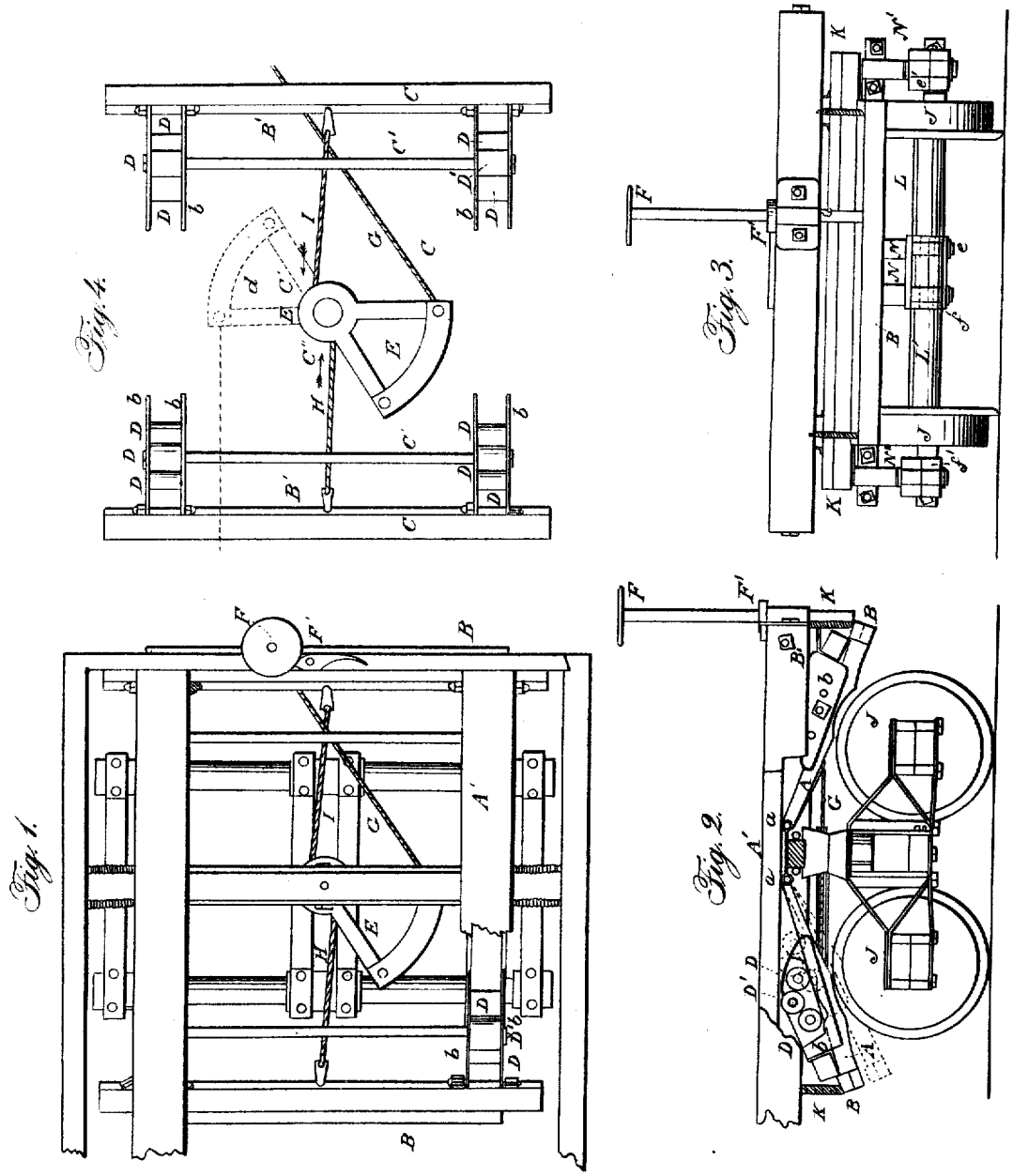

C. W. SINGER, OF ANDERSON STORE, VIRGINIA, ASSIGNOR TO HIMSELF AND ABEL LAND, OF ROCHESTER, OHIO.

IMPROVED CAR-BRAKE.

Specification forming part of Letters Patent No. 58,956, dated October 16, 1866.

*To all whom it may concern:*

Be it known that I, C. W. SINGER, of Anderson Store, in the county of Lewis and State of Virginia, have invented certain new and useful Improvements in Railroad-Car Brakes, &c.; and I do hereby declare that the following is a full and complete description of the construction and operation of the same, reference being had to the accompanying drawings, making a part of this specification, in which—

Figure 1 is a top view. Fig. 2 is a side view. Fig. 3 is an end view. Fig. 4 is a sectional view.

Like letters of reference refer to like parts in the views.

This improvement may be applied to trucks or truck-frames of the ordinary construction.

A A represent the rubbers shown in Fig. 2, which are hinged to the plate A' and truck-frame at *a a*. These rubbers are held in place by means of braces B, that extend from one side of the truck to the other. Between these rubbers and the plate A' is the slide B', composed of the braces C C' and the rollers D, D, and D', which have their bearings in the plates *b b* at each end of said rollers.

E represents a segment, being attached to the truck by the pivot or bolt which connects the car and truck. E' is a part of this segment-lever, forming a pulley or wheel. E is the windlass attached in the ordinary way to a pawl and ratchet, F', shown in Figs. 2 and 3.

The cord or chain G, attached to the shaft of the windlass, is fastened to the segment-lever, as shown in Fig. 4.

H I represents two cords or chains connected to the pulley E', one to one side and the other to the opposite side, the other end of these cords being fastened to the braces C, one at each end of the truck.

In braking the car the windlass is turned, which winds the cord G around the shaft of said windlass, and being fastened to the segment, which is pivoted as stated, will turn, moving in the direction of the arrow *c*. As the segment turns in this way the pulley or wheel forming a part of it will turn with it, which winds the cord I round it in one direction and the cord H in the other, each indicated by the arrows *c' c''*. By thus winding up the cords as stated, the end of them being fastened to the braces C, which form part of the slides B', they will be drawn up nearer together.

The roller D' rolls against the plate A', and the rollers D D on the upper side of the rubber A, (seen in Fig. 2,) as the slides are drawn toward each other, as stated, and the rollers moving between the plate A' and rubber referred to above, will press the rubber down on to the wheel J, as indicated by the dotted lines in Fig. 2, the slide B' forming a wedge between the plate and rubber. There being a rubber superimposed over each wheel, they are all pressed on to said wheels at once. Thus the whole weight of the car rests on the wheels.

When the pawl is thrown out of the ratchet-teeth the slide B by its own weight is permitted to move back to its original position, and the rubber will be raised by the action of the springs K, which are secured between the end of the rubber and truck. The attachment of the brake to one truck only has been described, and if a segment-lever similar to the one E can be placed on the opposite side, as indicated by the dotted line *d* in Fig. 4, and a cord or chain passing from one truck to the other, by this means the braking of the car can be at either end.

The axles of the wheels are divided, forming a double axle, the part L of the shaft having its bearings at *e e'* in the pedestals N N', and the part L' at *f f'* in the pedestals N N''. This prevents all torsion to the axle in turning curves.

What I claim as my improvement, and desire to secure by Letters Patent, is—

1. The rollers D D', in combination with the adjustable rubbers A and springs K, arranged in the manner and for the purpose set forth.

2. Hinging the rubbers to the truck-plates or frames so as to form inclined planes, thereby allowing the rollers to act as a wedge between the rubbers and plate A', to compress the said rubbers upon the wheels, and so that said rollers will move back independently on releasing the brake from the wheels, as and for the purpose set forth.

CHARLES W. SINGER.

Witnesses:
W. H. BURRIDGE,
J. HOLMES.